US012649695B2

(12) United States Patent (10) Patent No.: US 12,649,695 B2
Surace (45) Date of Patent: Jun. 9, 2026

(54) METHOD FOR DENSIFICATION OF CMC ARTICLE

(71) Applicant: RTX CORPORATION, Farmington, CT (US)

(72) Inventor: Raymond Surace, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 219 days.

(21) Appl. No.: 18/483,801

(22) Filed: Oct. 10, 2023

(65) Prior Publication Data

US 2024/0140878 A1 May 2, 2024

Related U.S. Application Data

(60) Provisional application No. 63/420,896, filed on Oct. 31, 2022.

(51) Int. Cl.
*C04B 35/80* (2006.01)
*C04B 35/628* (2006.01)

(52) U.S. Cl.
CPC ........ *C04B 35/80* (2013.01); *C04B 35/62884* (2013.01); *C04B 35/62886* (2013.01); *C04B 35/62894* (2013.01); *C04B 2235/5256* (2013.01); *C04B 2235/6028* (2013.01); *C04B 2235/614* (2013.01); *C04B 2235/616* (2013.01)

(58) Field of Classification Search
None
See application file for complete search history.

(56) References Cited

U.S. PATENT DOCUMENTS

| | | | |
|---|---|---|---|
| 11,383,494 | B2 | 7/2022 | Hockemeyer et al. |
| 2012/0279631 | A1 | 11/2012 | Mizokami et al. |
| 2020/0148600 | A1 * | 5/2020 | She ................... C04B 35/62897 |
| 2020/0255345 | A1 | 8/2020 | Clark et al. |
| 2021/0070663 | A1 * | 3/2021 | Sellappan ............. C04B 35/573 |
| 2021/0199013 | A1 | 7/2021 | Read |
| 2021/0292245 | A1 | 9/2021 | Bouillon et al. |

OTHER PUBLICATIONS

European Search Report for European Patent Application No. 23205029.4 mailed Mar. 12, 2024.

* cited by examiner

*Primary Examiner* — Abbas Rashid
*Assistant Examiner* — Adrianna N Konves
(74) *Attorney, Agent, or Firm* — Carlson, Gaskey & Olds, P.C.

(57) ABSTRACT

A method for forming a CMC article includes wrapping first ceramic fibers around a mandrel to form inner fabric layers on the mandrel, depositing a first interface coating material on the first ceramic fibers, densifying the inner fabric layers to a partially-densified state with first ceramic matrix material, wrapping second ceramic fibers around the inner fabric layers to form outer fabric layers around the mandrel, depositing a second interface coating material on the second ceramic fibers, and densifying both the inner fabric layers and the outer fabric layers to a final-densified state with second ceramic matrix material.

11 Claims, 2 Drawing Sheets

METHOD FOR DENSIFICATION OF CMC ARTICLE

CROSS-REFERENCE TO RELATED APPLICATION

The present disclosure claims priority to U.S. Provisional Application No. 63/420,896 filed Oct. 31, 2022.

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Components in the turbine section are typically formed of a superalloy and may include thermal barrier coatings to extend temperature capability and lifetime. Ceramic matrix composite ("CMC") materials are also being considered for turbine components. Among other attractive properties, CMCs have high temperature resistance. Despite this attribute, however, there are unique challenges to implementing CMCs.

SUMMARY

A method for forming a ceramic matrix composite (CMC) article according to an example of the present disclosure includes wrapping first ceramic fibers around a mandrel to form inner fabric layers on the mandrel, depositing a first interface coating material on the first ceramic fibers, densifying the inner fabric layers to a partially-densified state with first ceramic matrix material, wrapping second ceramic fibers around the inner fabric layers to form outer fabric layers on the mandrel, depositing a second interface coating material on the second ceramic fibers, and densifying both the inner fabric layers and the outer fabric layers by vapor deposition to a final-densified state with second ceramic matrix material.

In a further embodiment of any of the foregoing embodiments, the depositing of the first interface coating material follows the wrapping of the first ceramic fibers around the mandrel.

In a further embodiment of any of the foregoing embodiments, the depositing of the first interface coating material is by chemical vapor infiltration.

In a further embodiment of any of the foregoing embodiments, the depositing of the first interface coating material precedes the wrapping of the first ceramic fibers around the mandrel.

In a further embodiment of any of the foregoing embodiments, the depositing of the first interface coating material is by tow-coating.

In a further embodiment of any of the foregoing embodiments, the densifying of the inner fabric layers with the first ceramic matrix material to the partially-densified state is conducted in a first tool that has a first geometric profile, and the densifying of the inner fabric layers and the outer fabric layers with the second ceramic matrix material is conducted in a second, different tool that has a second geometric profile that is different than the first geometric profile.

In a further embodiment of any of the foregoing embodiments, the mandrel has a geometry that is analogous to an airfoil.

In a further embodiment of any of the foregoing embodiments, the first ceramic fibers are in a fabric, and the wrapping includes wrapping the fabric around the mandrel.

In a further embodiment of any of the foregoing embodiments, in the partially-densified state the inner fabric layers have a porosity of 45% to 65%.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Fabrication of ceramic matrix composite (CMC) articles may begin with forming a ceramic fiber fabric into the geometry of the article to be produced. For hollow articles, ceramic fibers are braided or woven around a mandrel to form a fiber preform. The geometry of the mandrel is analogous to the geometry of the article such that the fiber preform takes the shape of the article. Subsequently, an interface coating is applied to the fiber preform, followed by densification with a ceramic matrix material to form the final or near final article. Densification may include a vapor deposition technique, such as chemical vapor infiltration. One challenge, however, is achieving a high state of densification in the final article, i.e., low porosity. Several densification cycles can be used to back-fill pores, but with progressively lower porosity at each cycle, the gas flow paths in the CMC become progressively more restricted or even blocked. As a result, the article becomes densification-limited, which may ultimately debit the properties of the CMC. This challenge may be especially pronounced in relatively thick-wall, multi-layered structures, as the restriction or closing of gas flow paths in outer layers reduces gas infiltration into interior inner layers and thus limits densification of the inner layers.

As will be appreciated from this disclosure, the disclosed methodology facilitates addressing one or more of the aforementioned challenges in CMC articles. Although the examples given may be based on turbine airfoils, the articles produced are not particularly limited and may be turbine vanes, turbine blade outer air seals, turbine blades, combustor or other hot section pieces. The disclosed methodology may also be widely applicable to different types of CMC, although silicon-containing ceramics are of most interest for use in gas turbine engine components. Example ceramic matrices are silicon-containing ceramic, such as but not limited to, a silicon carbide (SiC) matrix or a silicon nitride (Si3N4) matrix. Ceramic fibers are formed of bundles of filaments and may include, but are not limited to, silicon carbide (SiC) fibers or silicon nitride (Si3N4) fibers. The CMC article may be, but is not limited to, a SiC/SiC ceramic matrix composite in which SiC fiber fabric is disposed within a SiC matrix. The architecture pattern of the fibers in the fabric may be, but is not limited to, triaxial braid or a harness satin weave.

Figure 1:
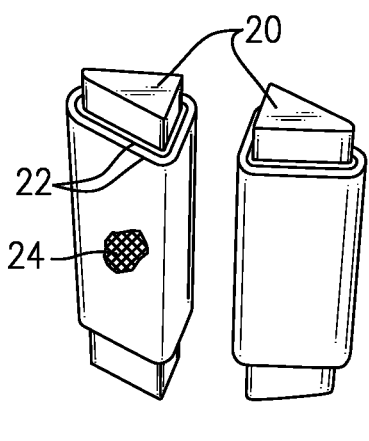
FIG. 1 illustrates mandrels for fabricating a CMC article.

FIG. 1 illustrates mandrels 20 for forming the CMC article. In this particular example, two mandrels 20 are used, although a single mandrel 20 or more than two mandrels 20 may be used for other types of articles. The mandrels 20 may be formed from, but are not limited to, graphite material, polymer material, metallic material, or composites of these materials. Here, the mandrels 20 correspond to internal cavities of a multi-cavity turbine airfoil. The fabrication of the CMC article will be discussed in more detail below but generally involves applying multiple fabric layers on each individual mandrel 20 and then applying additional fabric layers around the two mandrels 20 together as a pair. In the final CMC article, the inner fabric layers will form tubes that surround and define the internal cavities, and the outer fabric layers will form an exterior "skin" around the tubes.

Figure 2:
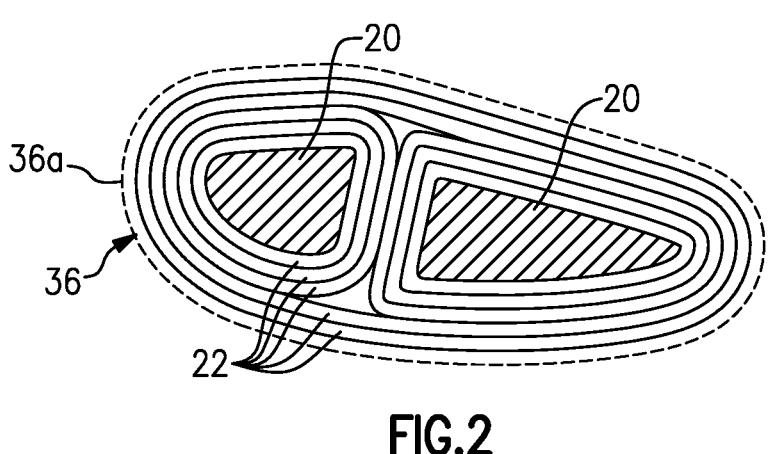
FIG. 2 illustrates an in-process article in which inner fabric layers have been applied to the mandrels.

The process may begin with application of first ceramic fibers 24 around each individual mandrel 20. For example, the fibers 24 may be applied as a pre-made fabric or may be applied by a machine (e.g., a braider) that is used to wrap the first ceramic fibers around each mandrel 20 to form inner fabric layers 22. The layers 22 are "inner" relative to the location of the mandrels 20. In other words, the CMC article is built outwardly from the mandrels 20. As shown in FIG. 2, additional inner fabric layers 22 may be applied around the two mandrels 20 as a pair. These additional layers will form the inner region of the skin of the airfoil. Alternatively, the additional layers for the skin may be applied later, after partial densification of the inner fabric layers 22. Thus, the additional layers may be considered to be inner fabric layers 22 if applied before the partial densification and may be considered to be outer fabric layers if applied after partial densification.

Figure 3:
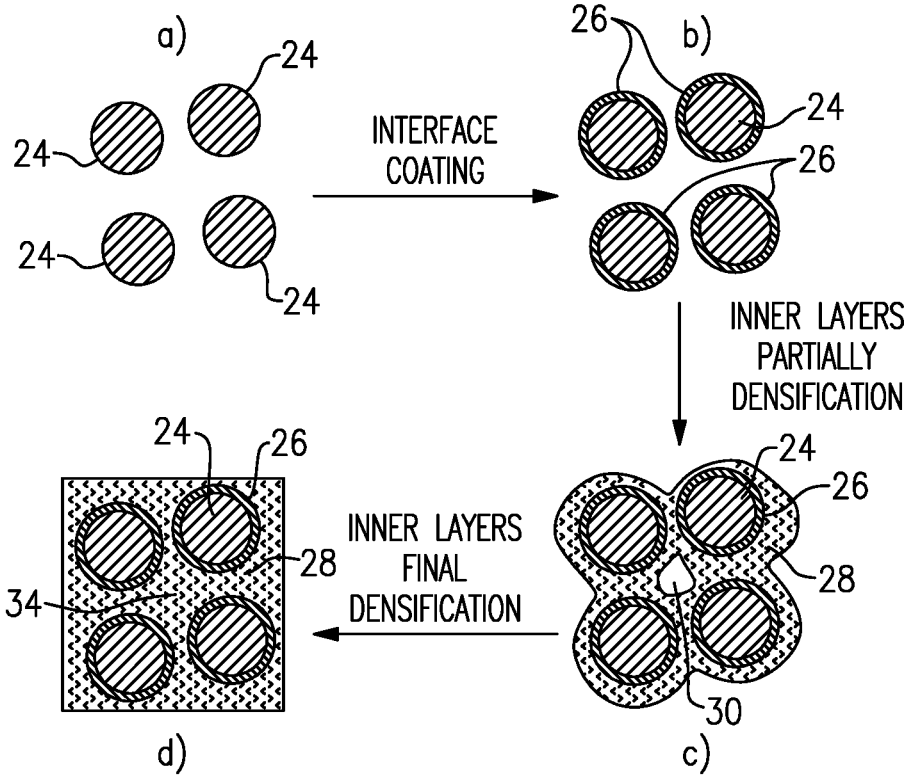
FIG. 3 pictorially illustrates the progression of the fabrication of CMC material in the inner fabric layers.

Referring also to FIG. 3 that shows the progression of the CMC fabrication in the inner fabric layers 22, the starting first ceramic fibers 24 are shown at a) and at b) a first interface coating material 26 is deposited on the first ceramic fibers 24. The interface coating material 26 may be, but is not limited to, boron nitride or carbon. The deposition may be conducted using known parameters for depositing interface coatings. As is known, interface coatings provide a relatively weak interface between the matrix and the fibers. As will be discussed later below, the timing of the application of the first interface coating material 26 with respect to the application of the first ceramic fibers 24 around each individual mandrel 20 may be varied.

At c) the inner fabric layers 22 are then densified by vapor deposition (e.g., chemical vapor infiltration) to a partially-densified state with first ceramic matrix material 28. That is, the densification is stopped prior to reaching a final densification level such that there is remaining porosity 30 in the inner fabric layers 22. For example, the remaining porosity is about 45% to about 65%. Such a porosity range serves to leave open paths for infiltration of additional matrix material upon densification of the outer fabric layers described below.

Additionally or alternatively, slurry infiltration may be used to deposit the first ceramic matrix material 28. For example, a mixture of silicon carbide particles in a carrier fluid is infiltrated into the inner fabric layers 22 (e.g., by using a vacuum). The mandrel 20 and inner fabric layers 22 may then be dried to remove the carrier fluid, such as by heating in a chamber or by natural evaporation at ambient temperatures. The mandrel 20 and fabric layers 22 may then be thermally processed at a sintering temperature to consolidate the silicon carbide particles by sintering.

Figure 4:
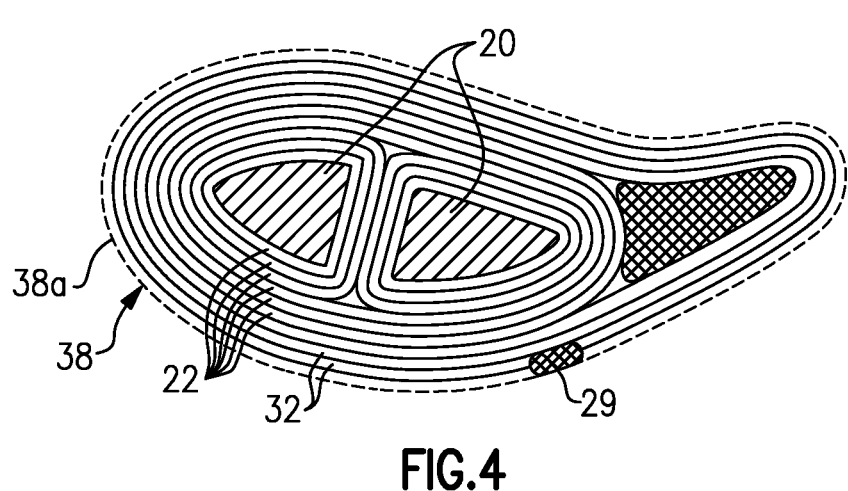
FIG. 4 illustrates an in-process article in which outer fabric layers have been applied to the mandrels.

Referring to FIG. 4, following the partial densification, second ceramic fibers or fiber fabric 29 is wrapped around the inner fabric layers 22 to form outer fabric layers 32 on the mandrels 20. If an insert(s) is used, such as at the trailing end of an airfoil, the insert may be added prior to wrapping of the second ceramic fibers or fiber fabric 29 so as to be incorporated into the final article. It is to be appreciated that the terms "first" and "second" are used herein to indicate architectural differences in location in the CMC component and do not necessarily imply that the elements to which they refer are the same or different in composition or properties. Most typically, however, the first and second ceramic fibers will be of the same composition and properties, the first and second ceramic matrices will be of the same composition and properties, and the first and second interface coating materials will be the same composition and properties.

Following application of the outer fabric layers 32, a second interface coating material is deposited on the second ceramic fibers 29. Due to the porosity, a portion of the second coating material may infiltrate and deposit on the inner fabric layers 22.

After the second interface coating material, both the inner fabric layers 22 and the outer fabric layers 32 are densified by vapor deposition (e.g., chemical vapor infiltration) to a final-densified state with second ceramic matrix material 34. For instance, some of the deposition gas infiltrates though the outer fabric layers 32 to deposit in the remaining porosity of the inner fabric layers 22, as shown at d) in FIG. 3. As some of the matrix in the inner fabric layers 22 was previously deposited at c), even if gas flow paths through the outer fabric layers 32 becomes restricted, the inner fabric layers 22 can tolerate reduced gas flow because there is less pore volume to fill than if no matrix was previously deposited. Moreover, the filling of the remaining porosity in the inner fabric layers 22 facilitates matrix continuity between the outer fabric layers 32 and the inner fabric layers 22, thereby providing interfacial strengthening there between.

The progression of CMC fabrication in the outer fabric layers 32 is similar to that of the inner fabric layers 22 except that for the outer fabric layers 32 the progression is from a) to b) to d). There is no progression c), as the there is no discrete partial densification of the outer fabric layers 32.

As mentioned above, the timing of the application of the first interface coating material 26 with respect to the application of the first ceramic fibers 24 around each individual mandrel 20 may be varied. That is, the first interface coating material 26 may be applied either before or after application of the first ceramic fibers 24 around the mandrels 20. If after, vapor deposition, such as chemical vapor infiltration, may be used. If before, tow-coating may be used to apply the first interface coating material 26 onto the first ceramic fiber tows. Tow-coating may involve, but is not limited to, running the tows through a coater. For instance, the coater contains a slurry or other liquid precursor that adheres to the fiber tows. The tows may then be subjected to drying and thermal processing. In another example, the tows are run through a reactor that contains a vapor of the coating material or precursors that deposit by vapor deposition onto the tows. As will also be appreciated, the mandrels 20 are also removed. The removal may be after application of the first interface coating material 26, after partial densification of the inner fabric layers 22, or after final densification of layers 22/32, such as by mechanically withdrawing the mandrels 20 from the surrounding layers.

In a further example of any of the examples above, tooling is used at various stages to support the in-process article. For example, the densifying of the inner fabric layers 22 with the first ceramic matrix material 28 to the partially-densified state is conducted in a first tool, represented at 36 in FIG. 2. The first tool 36 has a first geometric profile 36a, which is analogous to the peripheral shape of the in-process article after application of the inner fabric layers 22. The densifying of the inner fabric layers 22 and the outer fabric layers 32 with the second ceramic matrix material 34 is conducted in a second, different tool 38 (FIG. 4) that has a second geometric profile 38a that is different than the first geometric profile 36a. The second geometric profile 38a is analogous to the peripheral shape of the in-process article after application of the outer fabric layers 32 and is thus larger than the first geometric profile 36a by the thickness of the outer fabric layers 32 and inclusion of any inserts. Use of the two tools 36/38 permits dimensions to be maintained at each interface coating and densification stage, as the tools define the peripheral boundary of the resulting article. If attempting to use a single tool for both densifications, the in-process article would become too large after the application of the second fabric layers 32 to fit back into the same tool without damaging the article. Thus, the difference in the sizes of the tools 36/38 enables the densification process to, in essence, be divided into two discrete steps to thereby enhance the ability to reduce porosity in the final CMC article.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for forming a ceramic matrix composite (CMC) article, the method comprising:
    wrapping first ceramic fibers around a mandrel to form inner fabric layers on the mandrel;

depositing a first interface coating material on the first ceramic fibers;

densifying the inner fabric layers to a partially-densified state with first ceramic matrix material, wherein in the partially-densified state the inner fabric layers have a remaining porosity that leaves open paths;

wrapping second ceramic fibers around the inner fabric layers to form outer fabric layers on the mandrel;

depositing a second interface coating material on the second ceramic fibers; and densifying both the inner fabric layers and the outer fabric layers by vapor deposition to a final-densified state with second ceramic matrix material, the vapor deposition infiltrating into the inner fabric layers via the open paths to densify the inner fabric layers.

2. The method as recited in claim 1, wherein the depositing of the first interface coating material follows the wrapping of the first ceramic fibers around the mandrel.

3. The method as recited in claim 2, wherein the depositing of the first interface coating material is by chemical vapor infiltration.

4. The method as recited in claim 1, wherein the depositing of the first interface coating material precedes the wrapping of the first ceramic fibers around the mandrel.

5. The method as recited in claim 4, wherein the depositing of the first interface coating material is by tow-coating.

6. The method as recited in claim 1, wherein the densifying of the inner fabric layers with the first ceramic matrix material to the partially-densified state is conducted in a first tool that has a first geometric profile, and the densifying of the inner fabric layers and the outer fabric layers with the second ceramic matrix material is conducted in a second, different tool that has a second geometric profile that is different than the first geometric profile.

7. The method as recited in claim 1, wherein the mandrel has a geometry that is analogous to an airfoil.

8. The method as recited in claim 1, wherein the first ceramic fibers are in a fabric, and the wrapping includes wrapping the fabric around the mandrel.

9. The method as recited in claim 1, wherein in the remaining porosity is 45% to 65%.

10. The method as recited in claim 1, wherein the densifying of the inner fabric layers is conducted by at least one of vapor infiltration or slurry infiltration.

11. The method as recited in claim 1, wherein the depositing a first interface coating material on the first ceramic fibers follows the wrapping of the first ceramic fibers around the mandrel, and the depositing of the second interface coating material on the second ceramic fibers follows the wrapping of the second ceramic fibers around the inner fabric layers.

* * * * *